(12) United States Patent
Bloedorn

(10) Patent No.: US 6,564,745 B1
(45) Date of Patent: May 20, 2003

(54) HANGING TRAY BIRD FEEDER

(75) Inventor: Dan A. Bloedorn, Chilton, WI (US)

(73) Assignee: Backyard Nature Products, Inc., Chilton, WI (US)

( * ) Notice: Subject to any disclaimer, the term of this patent is extended or adjusted under 35 U.S.C. 154(b) by 0 days.

(21) Appl. No.: 10/057,102

(22) Filed: Oct. 25, 2001

(51) Int. Cl.[7] ............................................. A01K 61/02
(52) U.S. Cl. ......................................................... 119/57.8
(58) Field of Search .............................. 119/57.8, 51.01, 119/52.1, 52.2, 51.03; D30/124

(56) References Cited

U.S. PATENT DOCUMENTS

| | | | | |
|---|---|---|---|---|
| 1,749,497 A | * | 3/1930 | McGlashan | 119/52.7 |
| 2,316,463 A | * | 4/1943 | Skulina | 119/51.01 |
| 2,634,705 A | | 4/1953 | Mayes | |
| 2,786,446 A | | 3/1957 | Newman | |
| 3,253,576 A | * | 5/1966 | Tvedten | 119/51.01 |
| D249,285 S | | 9/1978 | Podjan | |
| 4,958,595 A | * | 9/1990 | Richman et al. | 119/52.2 |
| 5,040,491 A | * | 8/1991 | Yancy | 119/533 |
| 5,215,040 A | * | 6/1993 | Lemley | 119/52.3 |
| 5,988,111 A | | 11/1999 | Kujath | |
| D448,125 S | * | 9/2001 | Ranly | D30/121 |

* cited by examiner

Primary Examiner—Charles T. Jordan
Assistant Examiner—Judith A. Nelson
(74) Attorney, Agent, or Firm—Boyle Fredrickson Newholm Stein & Gratz S.C.

(57) ABSTRACT

A hanging tray bird feeder including a self-aligning supporting mechanism. The supporting mechanism includes a pair of hangers pivotally attached to opposite sides of the bird feeder and a hook slidably mounted to each of the hangers. When the hook is pulled upwardly and away from the bird feeder, the hook pulls each of the hangers outwardly from within the bird feeder into continuously aligned, extended positions above the feeder that allow the feeder to always be positioned in a level configuration when the bird feeder is attached to a tree limb by the hook.

19 Claims, 2 Drawing Sheets

HANGING TRAY BIRD FEEDER

FIELD OF THE INVENTION

The present invention relates to bird feeders, and more specifically to a bird feeder having a pair of pivotable hangers which are used to support and automatically level the bird feeder.

BACKGROUND OF THE INVENTION

Bird feeders of various sizes and configurations are widely used to provide wild birds with a ready supply of seeds. The feeders usually comprise a tray or other supporting surface on which the seeds are placed upon and which the birds may perch to get at the seeds. To make birds more apt to use the feeders, a large number of bird feeders are designed to be hung from tree limbs or other elevated structures. For feeders of this type, the support structure normally used to support or retain the feeder on the tree limb takes the form of one or more hooks which are attachable to the tree limb. These hooks are connected to the bird feeder tray by one or more pieces of string, rope, cable or other suitable material. In most cases, a piece of rope is secured to each corner of the bird feeder tray and connected opposite the bird feeder to a single hook in order to provide equal support to all corners of the bird feeder tray.

While the pieces of rope, string, cable, etc. provide adequate support to retain the bird feeder on the limb, in many situations the use of these materials to support the bird feeder in this manner results in the bird feeder being supported on the tree limb such that the bird feeder is not level. For example, one or more of the ropes attaching the feeder tray to the hook can be longer or shorter than the remaining ropes. Also, even if the bird feeder is secured to the tray in a level configuration, the particular method of attachment of the ropes to the supporting hook may allow the ropes to become lengthened or stretched over time, or to slide with respect to the hook, resulting in a situation where the bird feeder tray is no longer positioned in a level configuration. This results in a situation where bird seed placed on the bird feeder may spill over one or more sides of the feeder. Furthermore, the weight of birds landing on the sides of the feeder tray can exacerbate the uneven tray and cause even more seeds to spill out of the tray.

Therefore, it is desirable to develop a supporting mechanism for a bird feeder which automatically levels the bird feeder tray upon attachment of the mechanism to a tree limb, and which incorporates support structures which will maintain the bird feeder tray in a level, horizontal position while the feeder tray is in use.

SUMMARY OF THE INVENTION

It is an object of the present invention to provide a supporting mechanism for a bird feeder which automatically levels the bird feeder tray upon attachment of the mechanism to a tree limb or other supporting structure.

It is another object of the present invention to provide a supporting mechanism for a bird feeder which incorporates a number of support members which are capable of maintaining the bird feeder tray in a level position while the bird feeder is in use.

It is still another object of the present invention to provide a supporting mechanism for a bird feeder which has a simple construction that is easily assembled and employed in conjunction with conventional bird feeders.

It is still a further object of the invention to provide a supporting mechanism for a bird feeder that can be stored within the feeder when not in use, e.g., during shipment of the bird feeder.

The present invention is a supporting mechanism for use with a bird feeder including a generally flat seed tray. The mechanism incorporates a pair of pivotable hangers connected to the bird feeder and operably connected to one another. The hangers are attached at opposite ends to opposed sides of the bird feeder tray, such that when the bird feeder is not in use, the hangers can be positioned in a nested configuration within the bird feeder tray.

The mechanism also includes a single hook attached to the hangers opposite the tray. The hook includes a limb attaching loop that is releasably engaged with a tree limb and a hanger securing loop that is slidably mounted to both of the hangers.

When the bird feeder is to be mounted to a support structure, the limb engaging portion of the hook is grasped and pulled outwardly from within the bird feeder to withdraw the hangers from within the bird feeder. The hook is pulled outwardly until the hangers are fully extended out of the feeder tray. When the hangers are fully extended, the hangers are automatically aligned with respect to one another to support the feeder tray in a level configuration. The limb attaching loop of the hook is then attached to the tree limb or other supporting structure, so that when the hook is secured to the tree limb, the hook functions to maintain the hangers in alignment with respect to one another and to the feeder tray such that the bird feeder is constantly maintained in a level, horizontal position.

Various alternative embodiments and variations of the present invention will become apparent to one of ordinary skill in the art based on the following detailed description taken together with the drawings.

BRIEF DESCRIPTION OF THE DRAWINGS

The following drawings illustrate the best mode currently contemplated of carrying out the invention.

In the drawings.

DETAILED DESCRIPTION OF THE INVENTION

Figure 1:
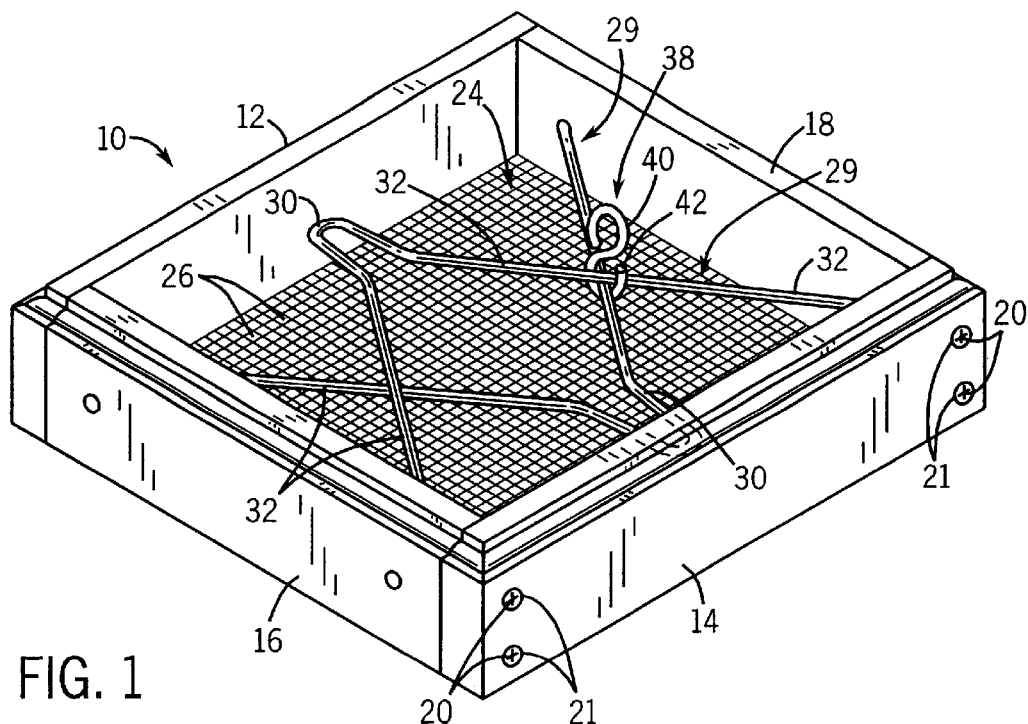
FIG. 1 is an isometric view of a bird feeder including a supporting mechanism constructed according to the present invention in a storage position.

With reference now to the drawing figures in which like reference numerals designate like parts throughout the disclosure, a bird feeder is shown generally at 10 in FIG. 1. The feeder 10 has a generally rectangular shape and is formed of a first transverse brace 12 connected at each end to a second transverse brace 14 by a pair of end braces 16 and 18. The first brace 12 and second brace 14 are secured to opposite ends of the end braces 16 and 18 by a number of screws 20 inserted through openings 21 in the first and second braces 12 and 14, respectively, and engaged with the end braces 16 and 18. The first brace 12, second brace 14 and end braces 16 and 18 are preferably made of wood, but may also be formed of any other suitable generally rigid material. Furthermore, instead of screws 20, the respective braces may be secured to one another to form the feeder 10 by any other suitable securing means, such as an adhesive, or a number of nails driven between the respective braces.

Each of the respective braces also includes a generally rectangular groove 22 disposed adjacent a lower end of each brace. When the braces are secured to one another to form the feeder 10, the grooves 22 on each brace 12, 14, 16 and 18 are positioned in alignment with each other to form a continuous groove which extends around the periphery of the interior of the feeder 10. The aligned grooves 22 engage and retain the edges of a floor or tray 24 that is disposed within the interior of the feeder 10 between the braces. The tray 24 includes a number of apertures or holes 26 which permit moisture to be drained through the tray 24 of the bird feeder 10, while enabling the tray 24 to have sufficient strength to support the weight of the bird feed and seed contained within feeder 10 without the need of additional support members. The tray 24 is preferably made of a perforated steel sheet, or an expanded steel sheet. Perforated steel sheets are sheets of steel having a pattern of holes which have been punched, pierced or bored into the material. Round holes are the most common, although other decorative design patterns are possible. Expanded metal sheets are sheets of metal which have a pattern of regular diamond-shaped openings joined by continuous uniform strands of material. The material is made by simultaneously slitting and stretching the material to expand it. The apertured floor preferably has holes in the range of 1/16 to 1/8 inches, and bars (i.e. the solid portion of the material between the holes) in the range of about 1/16 to 1/8 inches. Consequently, the apertures comprise about 25%–75% of the surface area of the tray 24 of the bird feeder 10. Suitable perforated or expanded steel sheets are available from, for example, McNichols Company, Tampa, Fla. and Metalex, Libertyville, Ill.

In this context, ordinary window screening and other wire cloth materials are considered not to be within the definition of, and not equivalent to, the apertured tray 24, and in particular the perforated metal and expanded metal sheets described herein. Wire screens, mesh or cloth are basically made of interwoven wires. It is simply impractical to make wire screen, mesh or cloth in which the wires are thick enough for the strength requirements, and also make the spaces (i.e., holes 26) between the wires small enough to hold the bird seed. Ordinary window screening is too light to have enough strength to serve the function required herein, at least without the use of additional framing or other structural support.

Certain plastics or fiberglass materials might be suitable for use in fabricating an apertured tray 24, but the disadvantage in using such materials is that a special mold must be made in order to fabricate the part, which substantially adds to the cost.

Figure 2:
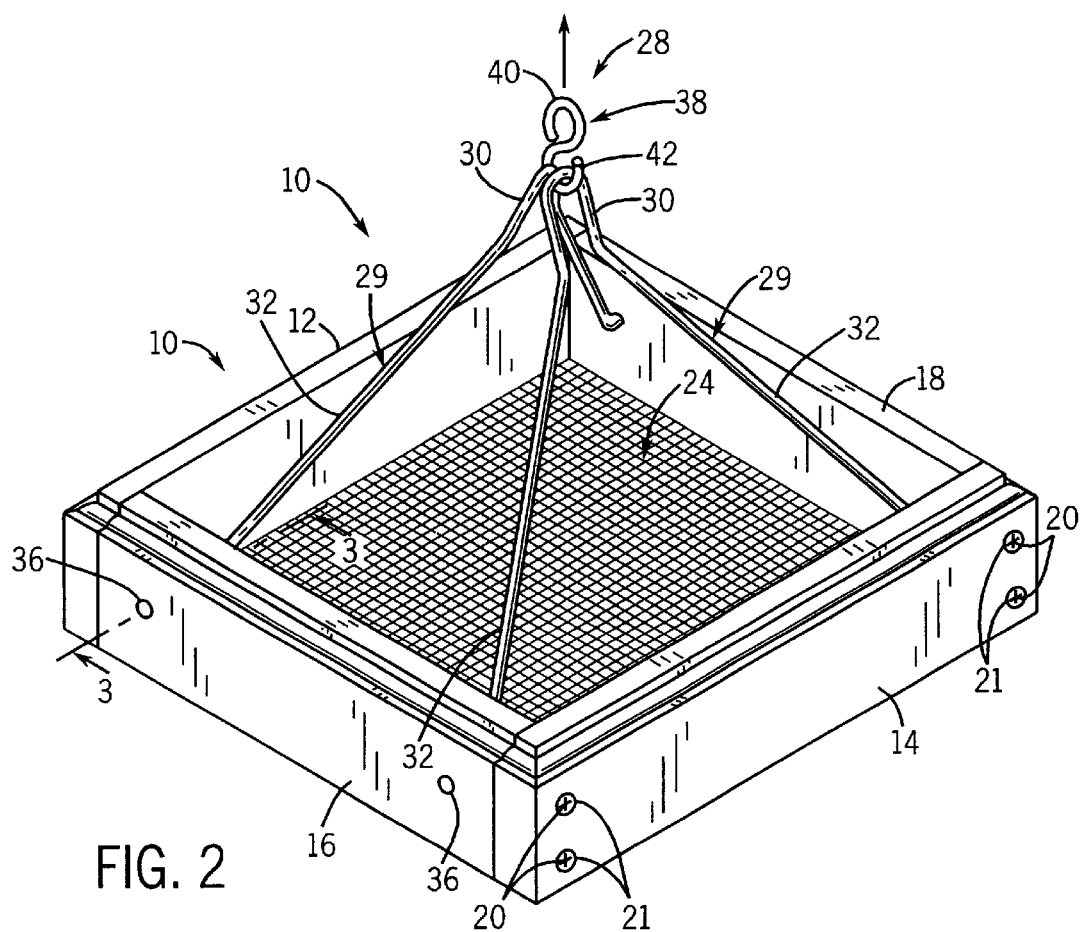
FIG. 2 is an isometric view of the feeder and mechanism of FIG. 1 with the mechanism in an extended, use position.
Figure 3:
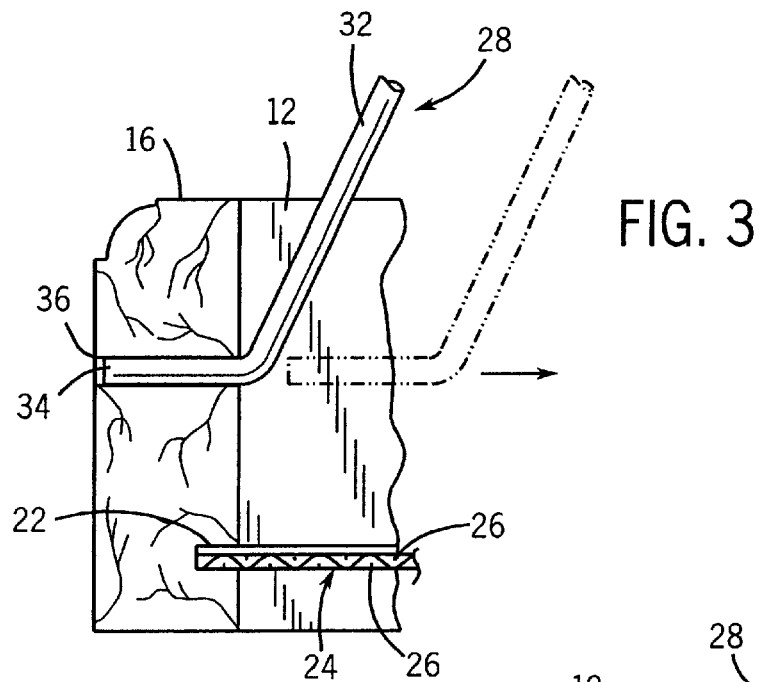
FIG. 3 is a cross-sectional view along line 3—3 of FIG. 2.

Referring now to FIGS. 1–3, the bird feeder 10 also includes a supporting mechanism 28 secured between the end braces 16 and 18. The mechanism 28 includes a pair of hangers 29 that are pivotally mounted between each of the end braces 16 and 18. The hangers 29 are preferably formed of a generally rigid, but flexible material, such as a metal, which has the strength to support the bird feeder 10 on a tree limb. While each of the hangers 29 is illustrated as being formed by a unitary piece of the generally rigid material, the hangers 29 can also be constructed of separate sections which are attached to one another to form the hangers 29. Each hanger 29 includes a central U-shaped catch 30 and a pair of legs 32 extending outwardly from each end of the catch 30. The legs 32 each extend outwardly at an angle with respect to the catch 30 and terminate in a pair of feet 34 that extend outwardly at an angle with respect to the legs 32. The feet 34 for each hanger 29 are each pivotally engaged within one of an aligned, opposed pair of holes 36 disposed in the end braces 16 and 18. The holes 36 extend completely through the respective end braces 16 and 18 and have a diameter slightly larger than that of the feet 34 so that the feet 34 can freely pivot within the holes 36. The width of each hanger 29 between the feet 34 is slightly wider than the width between the respective end braces 16 and 18. Therefore, to attach each hanger 29 to the end braces 16 and 18 of the bird feeder 10, the legs 32 must be deflected inwardly such that the feet 34 can be positioned between the end braces 16 and 18 in alignment with the holes 36. Once the feet 34 are positioned adjacent the opposed holes 36, the legs 32 are released such that the feet 34 are inserted into the holes 36 to retain the feet 34 within the holes 36.

The hangers 29 are connected to one another by a hook 38. The hook 38 is formed of a single piece of a rigid material, such as a hard, inflexible metal, and includes a securing loop 40 at one end and an attaching loop 42 at the opposite end. Preferably, the loops 40 and 42 are formed integrally with one another on the hook 38 as opposed portions of a generally S-shaped hook as shown in the drawing figures. Securing loop 40 has a diameter slightly larger than the attaching loop 42 and is disposed around each hanger 29. When the mechanism 28 is withdrawn from within the bird feeder 10, initially the securing loop 40 of the hook 38 is disposed around one leg 32 of each hanger 29. The hook 38 is then grasped and pulled upwardly such that the loop 40 slides along the pair of adjacent legs 32 to urge the hangers 29 upwardly and out of the bird feeder 10. The hook 38 continues to slide along each of the hangers 29 until the hook 38 reaches the central U-shaped catches 30. The loop 40 then enters the catch 30 on each hanger 29 and stops at the apex for each catch 30, thereby fully extending the hanger 29 from the feeder 10 and aligning the hangers 29 with one another.

After the hangers 29 are fully extended, the attaching loop 42 can be secured to the tree limb or other supporting structure, either directly or by utilizing any suitable attachment means, such as a piece of rope, or another hook which is secured directly to the tree limb. The sliding engagement of the securing loop 40 with the catches 30 on the hangers 29 enables the hangers 29 to extend downwardly from the hook 38 in a manner which continuously levels the bird feeder 10 by allowing the hangers 29 to adjust with respect to one another until the bird feeder 10 is level.

When taking down the bird feeder 10, once the attaching loop 42 of the hook 38 is disengaged from the tree limb, the hook 38 can be released and slid downwardly along each hanger 29, enabling the respective hangers 29 to pivot downwardly into the interior of the bird feeder 10. This allows the hangers 29 to be positioned within the feeder 10 in a nested storage configuration above the tray 24 with one hanger 29 being disposed in a nested configuration directly above the opposite hanger 29. Hook 38 remains attached to one leg 32 on each hanger 29 such that the hook 38 can again be used to extend and align the hangers 29 for reattachment of the bird feeder 10 to a tree limb.

Figure 4:
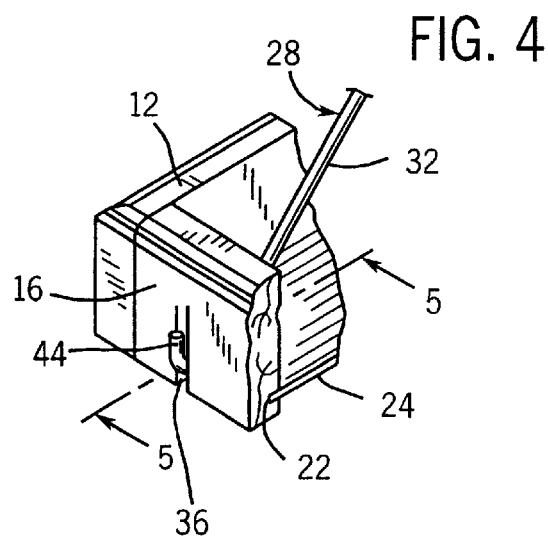
FIG. 4 is a partial sectional view of a second embodiment of the supporting mechanism of FIG. 1.
Figure 5:
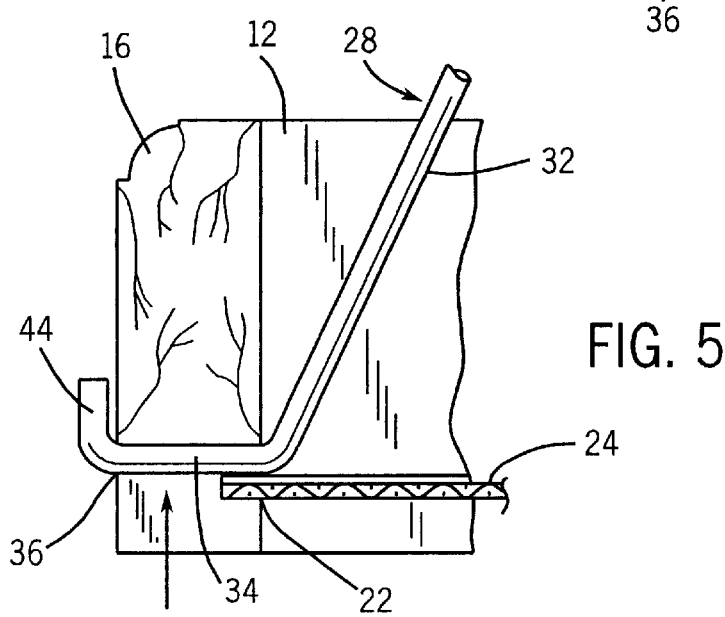
FIG. 5 is a cross-sectional view along line 5—5 of FIG. 4.

Looking now at FIGS. 4–5, a second embodiment of the hangers 29 is illustrated. In this embodiment, each hanger 29 is shaped similarly to the hangers 29 disclosed with respect to the first embodiment in FIGS. 1–3, with the added feature that the feet 34 on each hanger 29 include an upwardly curving tip 44 located opposite each of the legs 32 of the hangers 29. The tips 44 are disposed against the exterior of the end braces 16 and 18 opposite the hangers 29 and tray 24 when the hangers 29 are attached to the bird feeder 10.

In this configuration, the tips 44 ensure that the hangers 29 are maintained in engagement with the end braces 16 and 18 of the bird feeder 10 regardless of any deflection of the legs 32 of each hanger 29. In short, this configuration results in a construction for the bird feeder 10 which retains the hangers 29 in permanent attachment to the bird feeder 10.

Various alternatives are contemplated as being within the scope of the following claims particularly pointing out and distinctly claiming the subject matter regarded as the invention.

I claim:

1. A hanging tray bird feeder comprising:
    a base including a number of interconnected side panels and a floor supported by the panels; and
    a self-leveling hanging mechanism including at least one pair of hangers pivotally secured to the base and at least one hook slidably mounted to the at least one pair of hangers.

2. The hanging tray bird feeder of claim 1 wherein each of the at least one pair of hangers includes a pair of outwardly extending feet pivotably attached to the base and disposed at opposite ends of each of the at least one pair of hangers.

3. The hanging tray bird feeder of claim 2 wherein the feet are inserted into openings located in opposed side panels of the base.

4. The hanging tray bird feeder of claim 2 wherein each of the at least one pair of hangers includes a catch and a pair of angled legs extending from opposite sides of the catch and connected to the pair of feet opposite the catch.

5. The hanging tray bird feeder of claim 4 wherein the hook is slidably attached between one of the pair of legs on each of the at least one pair of hangers.

6. The hanging tray bird feeder of claim 5 wherein the hook includes a securing loop and an attaching loop.

7. The hanging tray bird feeder of claim 1 wherein the at least one pair of hangers are formed of a generally rigid material.

8. A hanging tray bird feeder comprising:
    a generally rectangular base including a pair of side panels secured to one another at opposite ends by a pair of end panels;
    a floor disposed within the base and supported by the side panels and end panels;
    a pair of hangers pivotally secured to the end panels; and
    a hook slidably mounted to the pair of hangers.

9. The hanging tray bird feeder of claim 8 wherein the side panels and end panels are formed of wood.

10. The hanging tray bird feeder of claim 8 wherein each of the pair of hangers includes a generally U-shaped catch, a pair of legs extending outwardly from each end of the catch, and a pair of feet extending outwardly from each leg opposite the catch.

11. The hanging tray bird feeder of claim 10 wherein the pair of feet are pivotally attached to the end panels within a pair of holes in the end panels into which the feet are inserted.

12. The hanging tray bird feeder of claim 11 wherein the pair of feet each include an upwardly extending tip opposite the pair of legs that releasably engages the end panels to retain the pair of hangers on the base.

13. The hanging tray bird feeder of claim 8 wherein the hook is formed of a rigid material.

14. The hanging tray bird feeder of claim 13 wherein the hook is formed of metal.

15. A method for hanging a tray bird feeder in a level configuration, the method comprising the steps of:
    a) providing a bird feeder including a base, a floor supported by the base, at least two hangers pivotably attached to opposite sides of the base, and at least one hook slidably secured to the at least two hangers;
    b) grasping the hook;
    c) sliding the hook along the at least two hangers to extend the at least two hangers from the base; and
    d) attaching the hook opposite the at least two hangers to a support structure.

16. The method according to claim 15 wherein the support structure is a tree limb.

17. The method according to claim 15 wherein the step of sliding the hook along the at least two hangers comprises the steps of:
    a) sliding the hook along one of a pair of angled legs on each of the at least two hangers; and
    b) engaging the hook within a catch disposed between the pair of angled legs on each of the at least two hangers.

18. The method according to claim 15 wherein the hook includes a securing portion secured to each of the at least two hangers and an attachment portion adjacent the securing portion and wherein the step of attaching the hook to the supporting structure comprises attaching the attaching position to the support structure.

19. The method according to claim 18 wherein the attachment portion is a loop.

* * * * *